United States Patent Office 3,013,105
Patented Dec. 12, 1961

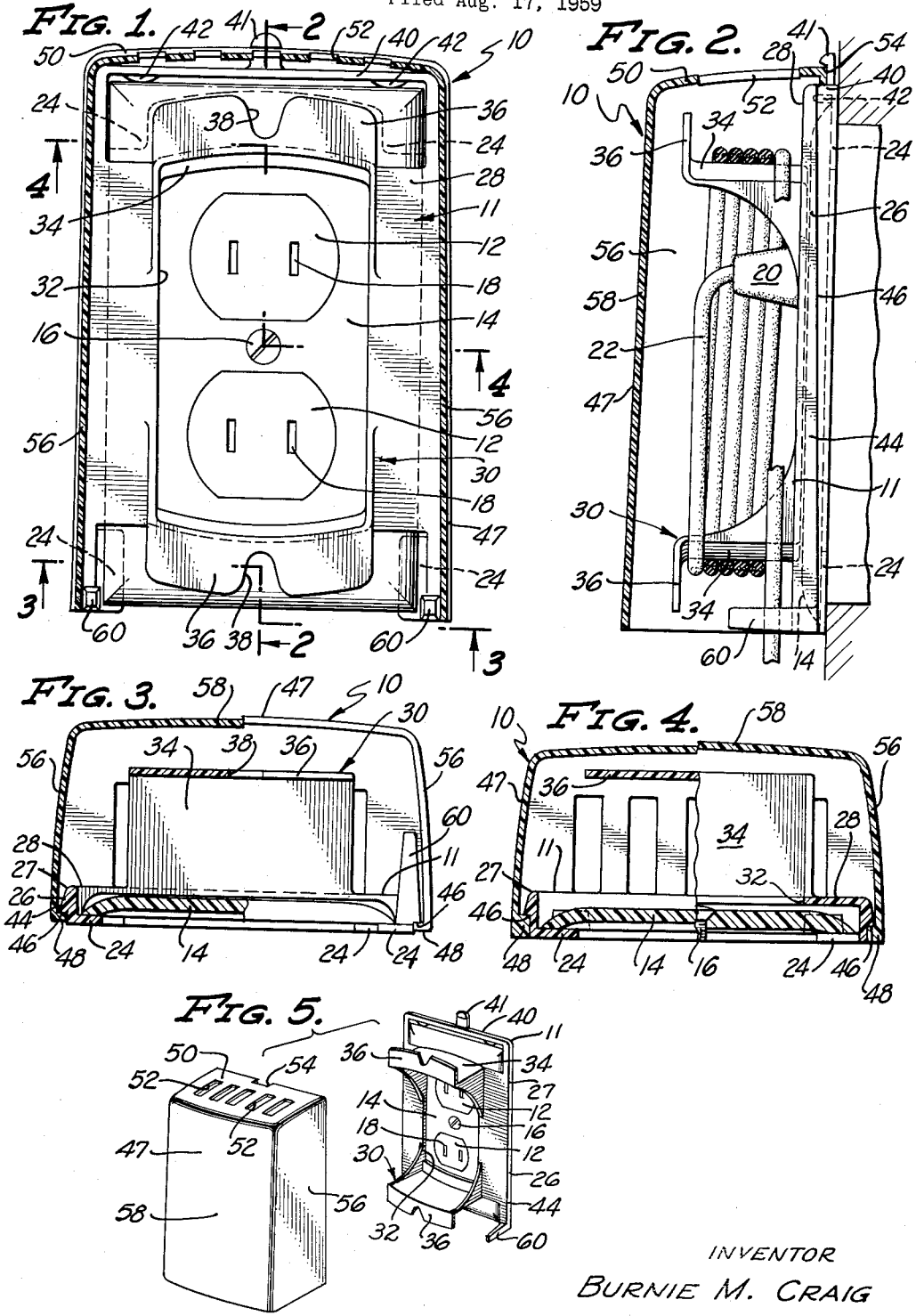

3,013,105
COVERED CORD HOLDER ATTACHMENT
FOR ELECTRICAL OUTLETS
Burnie M. Craig, Pasadena, Calif., assignor to Henry
Keck Associates, Pasadena, Calif., a partnership
Filed Aug. 17, 1959, Ser. No. 834,321
2 Claims. (Cl. 174—67)

My invention relates to a cord holder attachment for electrical outlets and more particularly to a covered cord holder attachment adapted to accommodate and conceal the excess or surplus amount of an electrical cord and to conceal the plug at the end of the cord.

Since electrical outlets are not always adjacent the proposed locations of electrical appliances, such appliances are conventionally provided with cords of considerable length. It has been a long known objection to electrical appliances having long cords that when the full amount of electrical cord is not used the excess must lie exposed on the floor of the room creating a hazardous and unsightly condition.

It is a primary object of this invention to provide an attachment to be used with electrical fixtures such as outlets that will accommodate any excess cord and hide it and its plug from view.

Another object of the invention is to provide an attachment to be secured to the face plate of an electrical outlet on which excess electrical cord may be wound and hidden from view.

A further object of the invention is to provide a cord holder secured to the face plate of an electrical outlet including a spool portion on which excess electrical cord may be wound and a cover member detachably secured to the spool portion to hide the cord from view.

An additional object of the invention is to provide a cord holder that may be molded by relatively simple and unexpensive plastic molds.

Still another and more specific object of the invention is to provide a cord holder having a mounting means insertable under the edges of the face plate of an electrical outlet and adapted to be clamped between the face plate and the wall, or the like, in which the outlet is located, a spool portion spaced forwardly from the mounting means a distance greater than the thickness of the face plate, and a cover member detachably secured to the spool portion to hide an electrical cord from view and to keep the turns of the cord from unwinding from the spool when it is wound on the spool portion.

A further object of the invention is to provide a cord holder having a mounting means insertable under the edges of the face plate of an electrical outlet, a spool portion spaced from the mounting means by a forwardly directed wall surrounding three sides of the cord holder, and downwardly tapered recesses along the vertical sides of the forwardly directed wall for slidably receiving a downwardly tapered lip member extending inwardly from the rearward periphery of a cover member in order to detachably secure the cover member thereto.

An additional object of the invention is to provide a cord holder secured to the face plate of an electrical outlet including a spool portion on which electrical cord may be wound, forwardly directed support arms spaced below the spool portion and at the outer perimeter of the holder plate for receiving the force of an upward or lateral pull on the electrical cord when the latter extends downwardly from one side of the spool portion, and a cover member detachably secured to the holder plate having an open bottom end from which the electrical cord extends, the aforementioned support arms receiving all the force from an upward or lateral pull on the cord thereby preventing the cover member from being dislodged.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:

FIG. 1 is a partially sectional view of the invention mounted on a conventional electrical outlet;

FIG. 2 is a partially sectional view of the invention taken along the arrowed line 2—2 of FIG. 1;

FIG. 3 is a partially sectional view of the invention taken along the arrowed line 3—3 of FIG. 1;

FIG. 4 is a sectional view of the invention taken along the arrowed line 4—4 of FIG. 1; and FIG. 5 is an exploded perspective view of the invention on a reduced scale.

Referring now to the drawing and in particular to FIGS. 1 and 2, the covered cord holder attachment is designated by the numeral 10 and is shown mounted on a dual electrical outlet 12 having a face plate 14 secured thereto by a screw 16 and providing apertures 18 for receiving a plug 20 of an electrical cord 22, as best shown in FIG. 2.

The cord holder 10 includes a holder plate 11 having adjacent its corners hook-shaped mounting flanges 24 which extend inwardly and which are adapted to be inserted under the edges of the face plate 14 to retain the cord holder in position over the electrical outlet 12, the flanges being clamped between the face plate and the wall, or other structure, in which the outlet is located.

The holder plate 11 includes a spool supporting means 28 for positioning a spool 30 forwardly of the face plate 14 and a spacing wall 26 extending forwardly from the mounting flanges 24 and peripherally of two sides and one end of the holder plate 11. The wall 26 extends forwardly a distance greater than the thickness of the face plate 14 and then merges, at 27, with the inwardly extending spool supporting means 28, as best shown in FIGS. 3 and 4, of the holder plate 11. The spool supporting means 28 is provided with a centrally located substantially rectangular aperture 32 which exposes the apertures 18 in the face plate 14 and the plug receiving sockets of the outlet 12. The spool 30 is comprised of forwardly extending arcuate walls 34 located at opposing ends of the rectangular aperture and terminating in outwardly directed guide flanges 36 in a plane parallel to the face plate 14 and perpendicular to the arcuate walls 34. Slots 38 are provided in the guide flanges 36 to permit access to additional screws, not shown, that may be used in securing face plates of varied construction to an electrical outlet.

The previously mentioned wall 26 is comprised of an end segment 40 and two sides segments 44. The end segment 40 has an outwardly extending substantially resilient latch member 41 for a purpose to be described, and has inwardly directed abutment bosses 42 engaging the top edge of the face plate 14 to align the holder plate 11 relative to the face plate. Extending along each of the side segments 44 of the wall 26 are converging or tapered recesses 46 for slidably receiving a tapered lip of a cover member 47, said recesses being of maximum depth adjacent the end segment 40.

The cover member 47 comprises a top portion or wall 50, two side portions or walls 56, and an inclined front portion or wall 58. In the top wall 50 is a notch 54 which receives the resilient latch member 41 to releasably secure the cover member 47 on the holder plate 11. Also formed in the top wall 50 are spaced ventilating apertures 52, the bottom of the cover member 47 being open to permit the cord 22 to extend into the holder 10. Extending along the rearward peripheral edges of the top wall 50 and the two side walls 56 of the cover member 47 and directed inwardly therefrom is a lip member 48 which is convergent or tapered along the side walls 56 for mating slidable engagement within the convergent recesses 46 of the holder plate 11, as best seen in FIGS. 3 and 4.

As best shown in FIGS. 1, 2, 3 and 5, forwardly directed support arms 60 are spaced below the spool 30 and at the outer perimeter of the holder plate 11. The arms 60 are provided to receive the force of an upward pull on the electrical cord 22 when the latter extends from one side of the open bottom of the cover member 47, thereby preventing dislodgment of the cover member.

In the normal course of usage of the cord holder attachment 10, the holder plate 11 is secured to the electrical outlet 12 by inserting the inwardly extending mounting flanges 24 under the edges of the face plate 14 of the outlet 12 and clamping them against the wall, or the like, by tightening the screw 16. The holder 10 is now in operational position with the bosses 42 on the upper portion 40 of the wall 26 abutting the upper edge of the face plate 14.

A plug 20 of a cord 22 is inserted through one of the apertures 18 of the face plate 14 into the under-lying socket. The cord 22 is then brought intermediate the arcuate walls 34 and wound about the spool 30. After winding the excess cord 22 about the spool 30 the desired usable cord extends downwardly along one side of said spool portion and adjacent one of the support arms 60 and between such arms.

It will be understood that while only one cord 22 is shown, the holder 10 is capable of handling a second cord in the same manner, the excesses of both being wound on the spool 30.

The cover member 47 is placed on the holder plate 11 by channeling the convergent sides of the lip member 48 into the complementary mating recesses 46 in the outer wall 26 and applying a downward force on the cover member, sliding it downwardly into position covering the wound electrical cord 22. The resulting wedging of the lip member 48 in the recesses 46 tends to prevent dislodgment of the cover member 47, and the cover member becomes further secured to the holder plate 28 when the latch member 41 enters the slot 54 and engages the top portion 50. In order to remove the cover member 47 from the holder plate 11 an upward and forward force is applied, thereby lifting the cover member free of the resilient latch member 41 and the tapered recesses 46.

Although an exemplary embodiment of the invention has been disclosed, it will be understood that other applications of the invention are possible and that the embodiment disclosed may be subjected to various changes, modifications and substitutions without departing from the spirit of the invention as defined by the following claims.

I claim:

1. A cord holder adapted to be secured to the face plate of an electrical outlet, including: a mounting means comprising inwardly extending flange members adapted to be inserted under the edges of a face plate; a spool supporting means spaced forwardly from said mounting means a distance greater than the thickness of the face plate; a forwardly extending peripheral wall surrounding two sides and one end of said spool supporting means and spacing said spool supporting means from said mounting means, said wall including an end segment and two side segments; abutment bosses extending inwardly from said end segment and engaging the top edge of the face plate; a spool carried by said spool supporting means and having forwardly extending arcuate walls terminating in outwardly directed guide flanges extending parallel to the face plate; a pair of support arms spaced below said spool and at the perimeter of said spool supporting means and extending forwardly therefrom; a cover member comprising a front portion, a top portion and two side portions; and means to slidably support the cover on said cord holder.

2. A cord holder adapted to be secured to the face plate of an electrical outlet, including: a mounting means comprising inwardly extending flange members adapted to be inserted under the edges of a face plate; a spool supporting means spaced forwardly from said mounting means a distance greater than the thickness of the face plate; a forwardly extending peripheral wall surrounding two sides and one end of said spool supporting means and spacing said spool supporting means from said mounting means, said wall including an end segment and two side segments; a latch member extending outwardly from said end segment; abutment bosses extending inwardly from said end segment and engaging the top edge of the face plate, said side segments each having tapered recesses therein; a spool carried by said spool supporting means and having forwardly extending arcuate walls terminating in outwardly directed guide flanges extending parallel to the face plate, said guide flanges each having a slot on its outer edge; a pair of support arms spaced below said spool and at the perimeter of said spool supporting means and extending forwardly therefrom; and a cover member comprising a front portion, a top portion, two side portions, said top portion having a latch member receiving slot and a plurality of ventilating apertures spaced therealong, and tapered lip members located at the rearward periphery of said top portion and said side portions, said lip members being tapered along the side portions so as to be slidably receivable within said recesses of said side segments for releasably securing said cover member.

References Cited in the file of this patent

UNITED STATES PATENTS

| | | |
|---|---|---|
| 2,231,001 | Engstrom | Feb. 11, 1941 |
| 2,510,745 | Kilgore | June 6, 1950 |
| 2,526,606 | Gregg | Oct. 17, 1950 |
| 2,722,665 | Sauder | Nov. 1, 1955 |